G. RESTUCCI.
RESILIENT WHEEL.
APPLICATION FILED MAY 5, 1910.
1,001,686.
Patented Aug. 29, 1911.
3 SHEETS—SHEET 1.
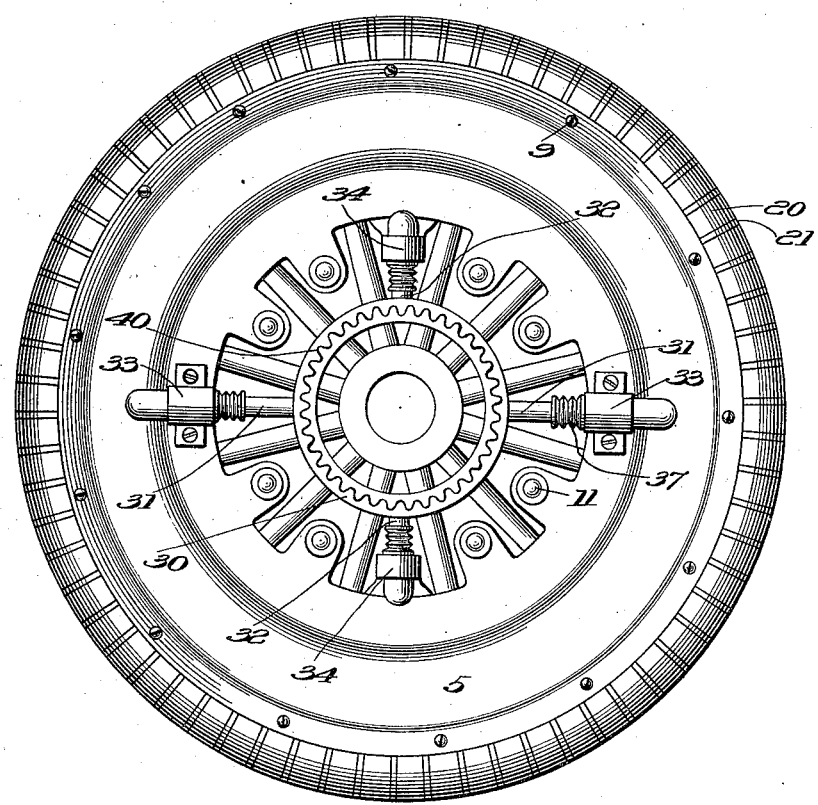
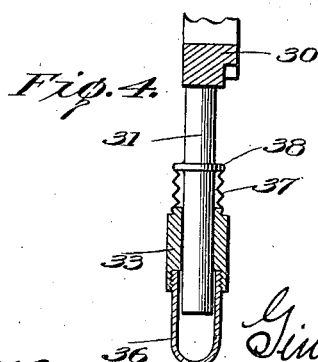

G. RESTUCCI.
RESILIENT WHEEL.
APPLICATION FILED MAY 5, 1910.
1,001,686.
Patented Aug. 29, 1911.
3 SHEETS—SHEET 2.
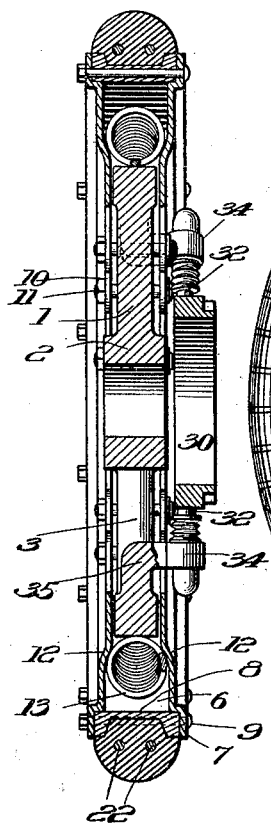
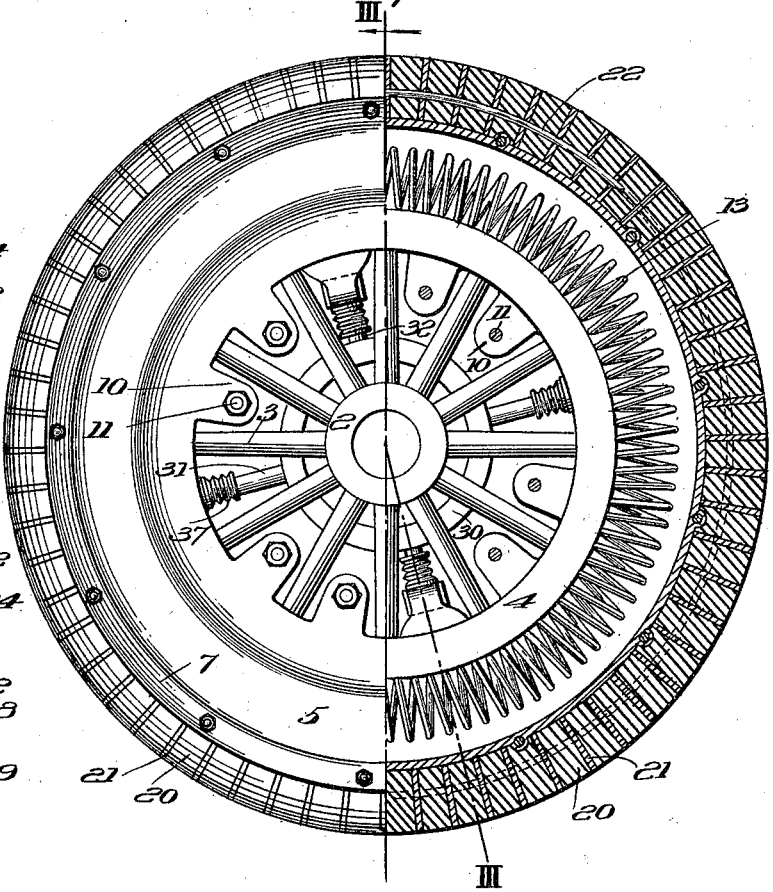
Giuseppe Restucci INVENTOR
BY Seward Davis
HIS ATTORNEY

G. RESTUCCI.
RESILIENT WHEEL.
APPLICATION FILED MAY 5, 1910.

1,001,686.

Patented Aug. 29, 1911.

3 SHEETS—SHEET 3.

UNITED STATES PATENT OFFICE.

GIUSEPPE RESTUCCI, OF NAPLES, ITALY, ASSIGNOR OF ONE-HALF TO THOMAS P. PUGLIATTI, OF NAPLES, ITALY.

RESILIENT WHEEL.

1,001,686.      Specification of Letters Patent.      Patented Aug. 29, 1911.

Application filed May 5, 1910. Serial No. 559,623.

*To all whom it may concern:*

Be it known that I, GIUSEPPE RESTUCCI, a subject of the King of Italy, residing in Naples, Italy, have invented certain new and useful Improvements in Resilient Wheels, of which the following is a specification.

My invention relates to resilient wheels for automobiles or other vehicles, and is designed to provide a wheel, which, while possessing great rigidity and being capable of efficiently transmitting a high tractive effort when used as a driving wheel, at the same time effectually absorbs all shocks and jars which would otherwise be transmitted to the vehicle.

Figure 6:
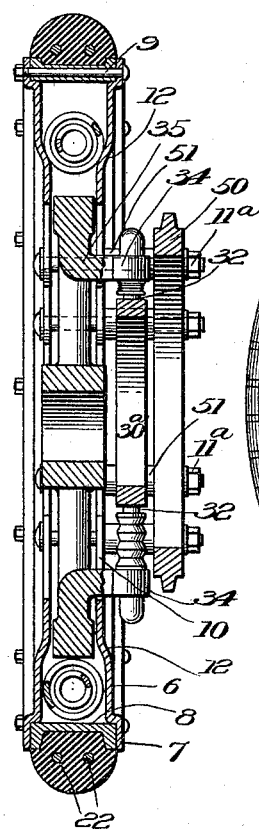
Figure 5:
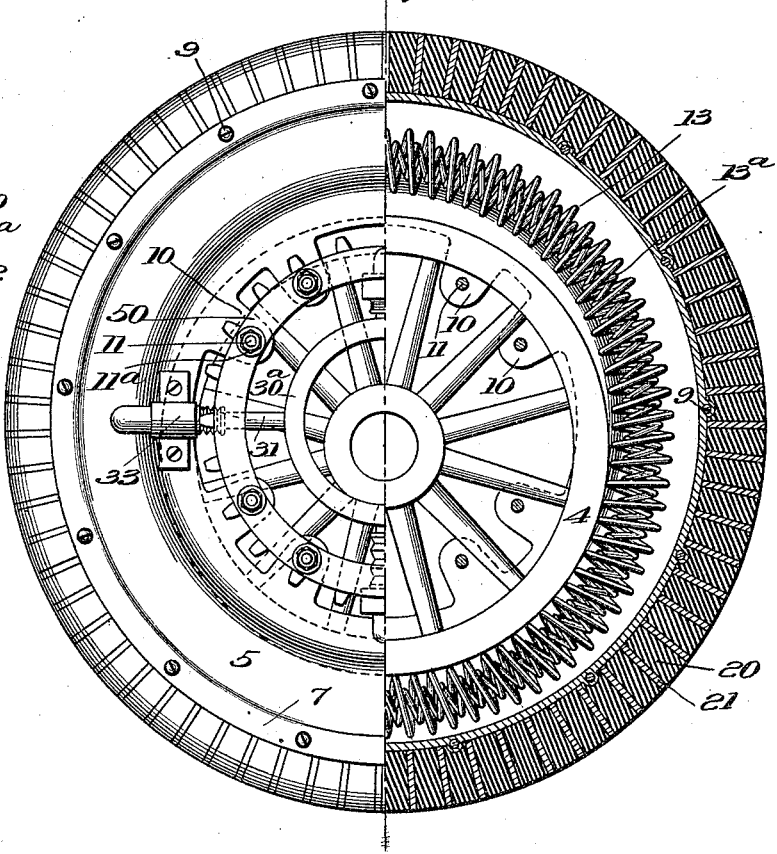

In the accompanying drawings, which form a part of this specification, Figure 1 is a side elevation of a wheel embodying my invention; Fig. 2 is a view of the wheel shown in Fig. 1 taken from the opposite side, a part of the wheel being shown in section; Fig. 3 is a transverse section of the wheel taken on line III—III of Fig. 2; Fig. 4 is a detail sectional view showing the construction of the bearing for one of the driving arms; Fig. 5 is a view of a modified form of wheel partly in section and partly in side elevation, the parts being illustrated in the positions which they assume when the wheel is subjected to shock or stress; and Fig. 6 is a vertical transverse section of the wheel shown in Fig. 5.

Referring to the drawings in detail, it will be seen that the wheel is composed primarily of two main portions working one within the other. The first of these portions is designated by the numeral 1, and for convenience will hereafter be referred to as the hub portion. This portion comprises the hub 2, spokes 3 and felly 4. Surrounding this portion of the wheel is the second main portion 5, which I will refer to as the casing, or in more general terms as the road engaging portion. The casing comprises the side plates 6, the outer edges of which are offset slightly, as indicated at 7, to receive the tire channel or rim 8, to which the side plates are secured by bolts 9, or in any other suitable manner. The side plates have projecting from their inner edges pairs of lugs 10 which are bolted together by bolts 11. The side plates are also offset to provide annular shoulders 12, these shoulders being located just outside of the circumference of the felly 4 of the hub portion of the wheel. A helical spring 13 having its ends connected together so that it forms an annulus is contained in the casing, being supported by the shoulders 12 and surrounding and supporting the felly 4. This spring is preferably given a considerable initial tension and forms the sustaining connection between the casing or the portion of the wheel which rests upon the ground and the hub portion of the wheel which supports the vehicle. It will be seen that the hub portion of the wheel is free to move within the casing except for the restraint placed upon it by this spring, so that the spring actually supports the entire load placed upon the wheel. As this spring extends entirely around the wheel, it can have a large number of convolutions and thereby be made to possess a greater capability for the absorption of shocks than is possible with the use of a short spring. Also, owing to the large number of convolutions, the separation of successive convolutions when the spring is extended is but slight, and no permanent deformation or set results. The entire spring is utilized for the absorption of shocks received upon any part of the wheel circumference.

In action, when the wheel is subjected to a shock, the hub portion is moved into an eccentric position with relation to the casing, the felly 4 engaging the spring at one extremity of a diameter and throughout the adjacent arcs on each side thereof, while at the other extremity of the diameter and throughout approximately a semi-circumference the spring remains supported by the shoulders. The spring is thus drawn into approximately elliptical form, as shown in Fig. 5, and, being lengthened, is thereby put under greater tension. It immediately tends to force the hub portion of the wheel back to its original position and keep the same concentric with the casing.

The casing may be provided with any suitable tread surface for engagement with the road, but I prefer to use a tire which I have devised composed of sections 20 of leather, rubber or the like, arranged alternately with sections 21 of metal. These sections are preferably cemented together to form a compact mass and are fitted to the channel 8 within which they are retained by the endless wires 22, or other suitable means. I do not claim the construction of this tire herein, as the same forms the subject matter of a companion application, filed May 5, 1910 Serial Number 559,624.

In order to give the wheel lateral rigidity, and also to prevent relative circumferential movement between the hub portion of the wheel and the casing, so that the wheel may be used for driving, I provide the ring 30, having projecting radially therefrom the arms 31 and 32 which I will hereinafter refer to as the driving arms. The pair of arms 31 pass through guides 33 rigidly secured to the casing, while the arms 32 are guided by bearings or eyes 34 secured to or formed upon lugs 35 projecting from the hub portion of the wheel. As shown in detail in Fig. 4, the several bearings or guides preferably have secured to the outer ends dust-caps 36, while flexible casings or bellows 37 of leather, or other suitable material, are attached to the inner ends of the bearings and to collars 38 carried by the driving arms. These dust-caps and bellows serve to exclude dust and mud from the bearings, thus insuring the free movement of the driving arms therethrough and eliminating undue wear. It will be seen that the ring 30 and driving arms carried thereby, while in no way hindering the freedom of radial movement between the hub portion of the wheel and the casing, hold the two wheel members in rigid relation so far as lateral and circumferential movements are concerned. Power may thus be transmitted from the vehicle to the road surface by means of the wheel, either by rotating the hub portion of the wheel or by driving the ring 30, as by means of the gear 40 carried thereby.

In Figs. 5 and 6 I have shown a form of my invention modified as to certain details. The wheel shown in these figures comprises the hub portion 1 and the casing or road engaging portion 5, the former being resiliently mounted within the latter, as in the previously described embodiment of my invention. An annular helical spring 13 is contained with the casing and engages the periphery of the hub portion of the wheel, this spring being shown as containing a second annular helical spring 13$^a$ preferably coiled in the opposite direction from spring 13. By the use of this second spring greater strength is obtained, and any tendency of either spring to uncoil is counteracted. The ring 30$^a$ of this modification, corresponding to the ring 30 previously described, does not carry a driving gear, but a separate driving gear 50 is used which is bolted to the lugs 10, or some of them, by means of bolts 11$^a$. Tubular spacers 51 surround the bolts between the lugs and the driving gear and support the gear in the desired position. By thus attaching a driving gear directly to the road engaging portion of the wheel, power is transmitted from the engine on the vehicle directly to the portion of the wheel which engages the road, and the ring 30$^a$ and its projecting arms are not required to transmit the driving torque. In this form of my apparatus the ring 30$^a$ and the arms are not essential, but are very useful for the purpose of giving the wheel a general rigidity except in the line of direct shock. In Figs. 5 and 6 the parts of the wheel are shown in the positions which they assume when the wheel is subjected to a severe shock or stress, the hub portion of the wheel being illustrated as depressed with relation to the road engaging portion thereof. As will be seen, the upper portion of the annular spring is supported upon the shoulders 12, while the lower portion has been carried away from its normal position by the lower portion of the periphery of the hub portion of the wheel. The spring is thus elongated and its tension increased.

Having thus set forth a preferred embodiment of my invention, but without desiring to limit myself to the exact construction described and illustrated, I claim:

1. In a vehicle wheel, in combination, a road-engaging portion, a hub portion, an annular spring surrounding the periphery of the hub portion and supporting the same within the loop comprising the lower part thereof, and supporting devices on the road-engaging portion for supporting the said spring by the loop comprising the upper part thereof.

2. In a vehicle wheel, in combination, a road-engaging portion having an annular shoulder thereon, an annular elastic member surrounding and supported by said shoulder, and a hub portion suspended in the loop of said elastic member.

3. In a vehicle wheel, in combination, a road engaging portion having an annular shoulder thereon, an annular spring surrounding and supported by said shoulder, and a hub portion suspended in the loop of said spring.

4. In a vehicle wheel, in combination, a road engaging portion comprising a pair of side members having annular shoulders formed on their inner faces, an annular helical spring supported between said side members by said shoulders, and a hub portion, the margin of which projects between said side members, the periphery of said hub portion engaging and being supported by said spring.

5. In a vehicle wheel, in combination, a road engaging portion comprising a tread, a pair of annular side plates secured thereto, said plates being offset inwardly between their edges to form annular shoulders, an annular helical spring supported between said plates by said shoulders, a hub portion, the margin of which extends between the inwardly offset portions of said plates, the periphery of said hub portion engaging and being supported by said spring.

6. In a vehicle wheel, in combination, a road engaging portion, a hub portion, resilient connections between the same, each of said portions being provided with a pair of alined guides, and a rigid member having projecting therefrom two pairs of arms, the arms of one pair being longitudinally alined and engaging the guides on said road engaging member, the arms of the other pair being also longitudinally alined, but disposed at right angles to the first named pair of arms and engaging the guides on the hub portion of the wheel.

7. In a vehicle wheel, in combination, a road-engaging portion having an annular shoulder thereon, an annular resilient member comprising a pair of helical springs arranged one within the other and coiled in opposite directions, surrounding and supported by said shoulder, and a hub portion suspended in the loop of said resilient member.

GIUSEPPE RESTUCCI.

Witnesses:
  SEWARD DAVIS,
  OLIVER WILLIAMS.

---

Copies of this patent may be obtained for five cents each, by addressing the "Commissioner of Patents, Washington, D. C."